(12) United States Patent
Wang

(10) Patent No.: US 11,109,222 B2
(45) Date of Patent: Aug. 31, 2021

(54) INFORMATION PROCESSING METHOD AND DEVICE, COMPUTER-READABLE STORAGE MEDIUM AND ELECTRONIC DEVICE

(71) Applicant: CHINA ACADEMY OF TELECOMMUNICATIONS TECHNOLOGY, Beijing (CN)

(72) Inventor: Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/486,896

(22) PCT Filed: Feb. 14, 2018

(86) PCT No.: PCT/CN2018/076820
§ 371 (c)(1),
(2) Date: Aug. 19, 2019

(87) PCT Pub. No.: WO2018/166328
PCT Pub. Date: Sep. 20, 2018

(65) Prior Publication Data
US 2020/0236534 A1    Jul. 23, 2020

(30) Foreign Application Priority Data
Mar. 15, 2017    (CN) .......................... 201710153931.9

(51) Int. Cl.
*H04W 4/00*    (2018.01)
*H04W 8/22*    (2009.01)
(Continued)

(52) U.S. Cl.
CPC ............... *H04W 8/22* (2013.01); *H04W 8/02* (2013.01); *H04W 8/18* (2013.01); *H04W 60/04* (2013.01)

(58) Field of Classification Search
CPC ........... H04W 8/22; H04W 8/02; H04W 8/18; H04W 60/04; H04M 1/72529; H04M 1/72522
(Continued)

(56) References Cited

U.S. PATENT DOCUMENTS

2005/0128980 A1* 6/2005 Han .................... H04W 36/14
                                                    370/331
2010/0008259 A1* 1/2010 Yoon .................... H04W 36/08
                                                    370/254
(Continued)

FOREIGN PATENT DOCUMENTS

CN    101626564 A    1/2010
CN    104185278 A    12/2014
(Continued)

OTHER PUBLICATIONS

Extended European Search Report dated Jan. 16, 2020 for European Patent Application No. 18768922.0.
(Continued)

*Primary Examiner* — Danh C Le
(74) *Attorney, Agent, or Firm* — Harness, Dickey & Pierce, P.L.C.

(57) ABSTRACT

The present disclosure relates to the field of communication technology, and provides an information processing method, an information processing device, a computer-readable storage medium and an electronic device, so as to reduce signaling overhead. The information processing method includes: receiving a registration update request from a UE; determining whether the UE has entered or left an MICO
(Continued)

mode; when the UE has left the MICO mode, sending a first message to an associated SMF, the first message being adopted to notify the associated SMF that the UE has left the MICO mode or the UE is reachable; and when the UE has entered the MICO mode, sending a second message to a target SMF, the second message being adopted to notify the target SMF that the UE has entered the MICO mode or the UE is unreachable.

20 Claims, 7 Drawing Sheets

(51) Int. Cl.
  *H04W 8/02* (2009.01)
  *H04W 8/18* (2009.01)
  *H04W 60/04* (2009.01)

(58) Field of Classification Search
  USPC .......................................... 455/437, 436, 439
  See application file for complete search history.

(56) References Cited

U.S. PATENT DOCUMENTS

| | | | |
|---|---|---|---|
| 2011/0275372 A1* | 11/2011 | Shi | H04W 8/04 455/435.1 |
| 2015/0222441 A1* | 8/2015 | Qu | H04L 12/1403 370/259 |
| 2016/0156678 A1* | 6/2016 | Li | H04L 65/1069 370/352 |
| 2016/0205606 A1* | 7/2016 | Park | H04W 24/10 455/436 |
| 2016/0286385 A1 | 9/2016 | Ryu et al. | |
| 2016/0302055 A1* | 10/2016 | Oohira | H04W 8/20 |
| 2016/0323845 A1 | 11/2016 | Kim et al. | |
| 2017/0126747 A1* | 5/2017 | Merino Vazquez | H04L 65/1016 |
| 2018/0116486 A1* | 5/2018 | Mizukami | A61B 1/045 |
| 2018/0132185 A1* | 5/2018 | Wang | H04W 4/06 |
| 2018/0191786 A1* | 7/2018 | Kunz | H04L 65/1016 |
| 2018/0191876 A1* | 7/2018 | Mueller | H04L 1/00 |
| 2018/0198867 A1 | 7/2018 | Dao et al. | |
| 2018/0227872 A1* | 8/2018 | Li | H04W 48/16 |
| 2018/0270896 A1* | 9/2018 | Faccin | H04W 4/70 |
| 2018/0317194 A1* | 11/2018 | Chen | H04W 60/04 |
| 2018/0376384 A1* | 12/2018 | Youn | H04W 36/14 |
| 2019/0045341 A1* | 2/2019 | Huang | H04L 41/0803 |
| 2020/0178048 A1* | 6/2020 | Kim | H04W 4/40 |
| 2020/0389864 A1* | 12/2020 | Ramle | H04W 60/02 |

FOREIGN PATENT DOCUMENTS

| | | |
|---|---|---|
| CN | 105900504 A | 8/2016 |
| EP | 3557905 A1 | 10/2019 |
| WO | WO-2018/127191 A1 | 7/2018 |

OTHER PUBLICATIONS

3GPP TS 23.501, V0.3.1 (Mar. 2017) 3rd Generation Partnership Project; Technical Specification Group Services and System Aspects; System Architecture for the 5G System; Stage 2 (Release 15), Mobile Competence Centre; Sohia-Antipolis Cedex, France, vol. SA WG2, No. V0. 3.1, Mar. 6, 2017, pp. 1-97, XP051290363.

3GPP TS 23.502, V0.2.0 (Feb. 2017), 3rd Generation Partnership Project; Technical Specification Group Services and System Aspects; Procedures for the 5G System; Stage 2, (Release 15), Mobile Competence Centre; Sohia-Antipolis Cedex, France, Feb. 24, 2017, XP051240493.

Qualcomm Incorporated et al., "TS 23.501: MO only and registration area", SA WG2 Temporary Document, SA WG2 Meeting #119, S2-171554 (was S2-170829) Dubrovnik, Croatia, Feb. 13-17, 2017.

International Preliminary Report on Patentability dated Sep. 26, 2019 for International Application No. PCT/CN2018/076820.

Written Opinion of the International Search Authority dated May 21, 2018 for International Application No. PCT/CN2018/076820.

3rd Generation Partnership Project; Technical Specification Group Services and System Aspects; System Architecture for the 5G System: Stage 2 (Release 15) 3G{{ TS 23/5-1 V0.30 28.2, Feb. 28, 2017.

Japanese Office Action dated Sep. 3, 2020 for Japanese Patent Application No. 2019-545971.

Huawei, HiSilicon, "Congestion control on SGs interface". 3GPP TSG CT WG1 Meeting #79, C1-122830, Chicago, IL, Aug. 6-10, 2012.

Qualcomm Incorporated, LG Electronics, "UE reachability in CN-IDLE, Power Saving functions and MO only", SA WG2 Meeting #118BIS, S2-170681, Spokane, WA, Jan. 16-20, 2017.

Samsung, "Interaction between AMF and SMF", SA WG2 Meeting #118-BIS, S2-170263, Spokane, WA, Jan. 16-20, 2017.

* cited by examiner

INFORMATION PROCESSING METHOD AND DEVICE, COMPUTER-READABLE STORAGE MEDIUM AND ELECTRONIC DEVICE

CROSS-REFERENCE TO RELATED APPLICATIONS

The present application is the U.S. national phase of PCT Application No. PCT/CN2018/076820 filed on Feb. 14, 2018, which claims a priority of the Chinese patent application 201710153931.9 filed on Mar. 15, 2017, which are incorporated herein by reference in their entirety.

TECHNICAL FIELD

The present disclosure relates to the field of communication technology, in particular to an information processing method, an information processing device, a computer-readable storage medium, and an electronic device.

BACKGROUND

User Equipment (UE) in a Mobile Initiated Connection Only (MICO) mode has been proposed in the related art, and in this mode the UE may merely initiate a calling procedure rather than monitoring network paging.

During the registration or registration update procedure, the UE indicates a network that the MICO mode is to be activated, and an Access and Mobility Management Function (AMF) of the network determines whether to activate the MICO mode for the UE in accordance with such information as local configuration, subscription and policy. When the UE has already been in the MICO mode, the AMF of the network allocates all Public Land Mobile Networks (PLMNs) for the UE as a registration area for the UE. At this time, the UE does not initiate the registration update procedure, i.e., a Tracking Area Update (TAU) procedure for position update, when the UE moves in a same PLMN. However, the UE may still initiate a periodic registration procedure. After the UE has already been in the MICO mode, the UE does not monitor the network paging.

In the related art, taking the registration update procedure initiated by the UE as an example, the AMF needs to notify all Session Management Functions (SMFs) serving the UE of position change information of the UE or AMF change information, so that each SMF may reselect a User Plane Function (UPF) or issue a downlink paging message. The UE in the MICO mode does not monitor the network paging, so the updating of these information at each SMF leads to unnecessary signaling overhead.

SUMMARY

An object of the present disclosure is to provide an information processing method, an information processing device, a computer-readable storage medium and an electronic device, so as to reduce the signaling overhead.

In one aspect, the present disclosure provides in some embodiments an information processing method, including: receiving a registration update request from a UE; determining whether the UE has entered or left an MICO mode; when the UE has left the MICO mode, sending a first message to an associated SMF, the first message being adopted to notify the associated SMF that the UE has left the MICO mode or the UE is reachable; and when the UE has entered the MICO mode, sending a second message to a target SMF, the second message being adopted to notify the target SMF that the UE has entered the MICO mode or the UE is unreachable.

In some possible embodiments of the present disclosure, the associated SMF includes an SMF to which an MICO indication or a UE-unreachable indication has been transmitted, and the target SMF includes an SMF to which the MICO or UE-unreachable indication has not yet been sent.

In some possible embodiments of the present disclosure, the MICO indication is carried in the second message. The MICO indication is adopted to indicate the target SMF that the UE has entered the MICO mode, so as to enable the target SMF not to send a notification or a downlink paging request. The notification is an information notification triggered when downlink signaling or data for the UE has arrived.

In some possible embodiments of the present disclosure, the information processing method further includes determining whether there is the target SMF and determining whether to send the second message to the target SMF.

In some possible embodiments of the present disclosure, the determining whether to send the second message to the target SMF includes: determining whether an AMF serving the UE has changed; and when the AMF serving the UE has changed, determining that the second message is to be transmitted to the target SMF. The second message is further adopted to notify the target SMF that the AMF currently serving the UE has changed.

In some possible embodiments of the present disclosure, an identifier is carried in the registration update request and adopted to indicate that uplink data needs to be transmitted by the UE. The information processing method further includes sending a third message to the SMF which is about to provide data transmission services for the UE. The third message is adopted to notify the SMF which is about to provide data transmission services for the UE to re-establish a data plane transmission path for the UE.

In some possible embodiments of the present disclosure, the determining whether the UE has entered or left the MICO mode includes: acquiring context information about the UE from an AMF before position update; and determining whether the UE has entered or left the MICO mode in accordance with the context information about the UE.

In another aspect, the present disclosure provides in some embodiments an information processing method, including: determining whether a UE has entered an MICO mode; and when the UE has entered the MICO mode, indicating an SMF serving the UE not to send a notification or a downlink paging request, wherein the notification is downlink signaling or an information notification triggered when a data has arrived.

In some possible embodiments of the present disclosure, the indicating the SMF serving the UE not to send the notification or downlink paging request when the UE has entered the MICO mode includes: when the UE has entered the MICO mode, determining the SMF serving the UE during the establishment of a Protocol Data Unit (PDU) session for the UE; and sending an MICO indication to the SMF, the MICO indication being adopted to indicate the SMF that the UE has entered the MICO mode so as to enable the SMF not to send the notification or downlink paging request.

In some possible embodiments of the present disclosure, the indicating the SMF serving the UE not to send the notification or downlink paging request when the UE has entered the MICO mode includes, when the UE has entered the MICO mode, rejecting the notification or downlink paging request from the SMF, and sending the MICO indication or a UE-unreachable indication to the SMF. The MICO indication or the UE-unreachable indication is adopted to indicate the SMF not to send the notification or the downlink paging request.

In some possible embodiments of the present disclosure, the information processing method further includes: storing information about the SMF to which the MICO indication or the UE-unreachable indication has been transmitted; and when the UE has left the MICO mode, sending a notification indicating that the UE has left the MICO mode to the SMF in accordance with the information.

In yet another aspect, the present disclosure provides in some embodiments an information processing method, including: when a notification or a downlink paging request needs to be transmitted, determining whether a UE has entered an MICO mode, wherein the notification is downlink signaling or an information notification triggered when a data has arrived; when the UE has entered the MICO mode, not sending the notification or the downlink paging request to the UE; and when the UE has not entered the MICO mode, determining whether the UE is reachable, and when the UE is unreachable, not sending the notification or the downlink paging request to an AMF serving the UE.

In some possible embodiments of the present disclosure, the determining whether the UE has entered the MICO mode includes: determining whether an MICO indication has been stored; and when the MICO indication has been stored, determining that the UE has entered the MICO mode, and otherwise determining that the UE has not entered the MICO mode.

In some possible embodiments of the present disclosure, the information processing method further includes, when the UE is reachable, sending the notification or the downlink paging request to the AMF serving the UE.

In still yet another aspect, the present disclosure provides in some embodiments an information processing device, including: a reception module configured to receive a registration update request from a UE; a first determination module configured to determine whether the UE has entered or left an MICO mode; a first processing module configured to, when the UE has left the MICO mode, transmit a first message to an associated SMF, the first message being adopted to notify the associated SMF that the UE has left the MICO mode or the UE is reachable; and a second processing module configured to, when the UE has entered the MICO mode, transmit a second message to a target SMF, the second message being adopted to notify the target SMF that the UE has entered the MICO mode or the UE is unreachable.

In some possible embodiments of the present disclosure, the associated SMF includes an SMF to which an MICO indication or a UE-unreachable indication has been transmitted, and the target SMF includes an SMF to which the MICO or UE-unreachable indication has not yet been sent.

In some possible embodiments of the present disclosure, the MICO indication is carried in the second message. The MICO indication is adopted to indicate the target SMF that the UE has entered the MICO mode, so as to enable the target SMF not to send a notification or a downlink paging request. The notification is an information notification triggered when downlink signaling or data for the UE has arrived.

In some possible embodiments of the present disclosure, the information processing device further includes a judgment module configured to determine whether there is a target SMF and determine whether to send the second message to the target SMF.

In some possible embodiments of the present disclosure, the information processing device further includes a third processing module configured to, when there is no target SMF or it is unnecessary to send the second message to the target SMF, directly complete a registration update procedure for the UE.

In some possible embodiments of the present disclosure, the judgment module includes: a first judgment sub-module configured to determine whether an AMF serving the UE has changed; and a second judgment sub-module configured to, when the AMF serving the UE has changed, determine that the second message is to be transmitted to the target SMF. The second message is further adopted to notify the target SMF that the AMF currently serving the UE has changed.

In some possible embodiments of the present disclosure, an identifier is carried in the registration update request and adopted to indicate that uplink data needs to be transmitted by the UE. The information processing device further includes a first transmission module configured to send a third message to the SMF which is about to provide data transmission services for the UE. The third message is adopted to notify the SMF which is about to provide data transmission services for the UE to re-establish a data plane transmission path for the UE.

In some possible embodiments of the present disclosure, the first determination module includes: an acquisition sub-module configured to acquire context information about the UE from an AMF before position update; and a determination sub-module configured to determine whether the UE has entered or left the MICO mode in accordance with the context information about the UE.

In still yet another aspect, the present disclosure further provides an information processing device, including: a determination module configured to determine whether a UE has entered an MICO mode; and an indication module configured to, when the UE has entered the MICO mode, indicate an SMF serving the UE not to send a notification or a downlink paging request, wherein the notification is downlink signaling or an information notification triggered when a data has arrived.

In some possible embodiments of the present disclosure, the indication module includes: a first determination sub-module configured to, when the UE has entered the MICO mode, determine the SMF serving the UE during the establishment of a PDU session for the UE; and a transmission sub-module configured to send an MICO indication to the SMF, the MICO indication being adopted to indicate the SMF that the UE has entered the MICO mode so as to enable the SMF not to send the notification or downlink paging request.

In some possible embodiments of the present disclosure, the indication module is further configured to, when the UE has entered the MICO mode, reject the notification or downlink paging request from the SMF, and transmit the MICO indication or a UE-unreachable indication to the SMF. The MICO indication or the UE-unreachable indication is adopted to indicate the SMF not to send the notification or the downlink paging request.

In some possible embodiments of the present disclosure, the information processing device further includes: a storage module configured to store information about the SMF to which the MICO indication or the UE-unreachable indication has been transmitted; and a transmission module configured to, when the UE has left the MICO mode, transmit a notification indicating that the UE has left the MICO mode to the SMF in accordance with the information.

In still yet another aspect, the present disclosure provides in some embodiments an information processing device, including: a determination module configured to, when a notification or a downlink paging request needs to be transmitted, determine whether a UE has entered an MICO mode, wherein the notification is downlink signaling or an information notification triggered when a data has arrived; a first processing module configured to, when the UE has entered the MICO mode, not transmit the notification or the downlink paging request to the UE; and a second processing module configured to, when the UE has not entered the MICO mode, determine whether the UE is reachable, and when the UE is unreachable, not transmit the notification or the downlink paging request to an AMF serving the UE.

In some possible embodiments of the present disclosure, the determination module includes: an information determination sub-module configured to determine whether an MICO indication has been stored; and a first determination sub-module configured to, when the MICO indication has been stored, determine that the UE has entered the MICO mode, and otherwise determine that the UE has not entered the MICO mode.

In some possible embodiments of the present disclosure, the information processing device further includes a transmission module configured to, when the UE is reachable, transmit the notification or the downlink paging request to the AMF serving the UE.

In still yet another aspect, the present disclosure provides in some embodiments a computer-readable storage medium storing therein a computer program. The computer program is executed by a processor so as to implement the above-mentioned information processing method.

In still yet another aspect, the present disclosure provides in some embodiments an electronic device, including a housing, a processor, a memory, a circuit board and a power source circuit. The circuit board is arranged within a chamber defined by the housing, and the processor and the memory are arranged on the circuit board. The power source circuit is configured to supply power to each circuit or element of the electronic device. The memory is configured to store therein an executable program code. The processor is configured to read the executable program code stored in the memory so as to run a program corresponding to the executable program code, thereby to implement the above-mentioned information processing method.

According to the embodiments of the present disclosure, when the UE has entered or left the MICO mode, a state of the UE may be notified to the SMF, so as to prevent any superfluous interaction between the SMF and the AMF, thereby to reduce the signaling overhead.

DETAILED DESCRIPTION

The present disclosure will be described hereinafter in conjunction with the drawings and embodiments. The following embodiments are for illustrative purposes only, but shall not be used to limit the scope of the present disclosure.

First Embodiment

Figure 1:
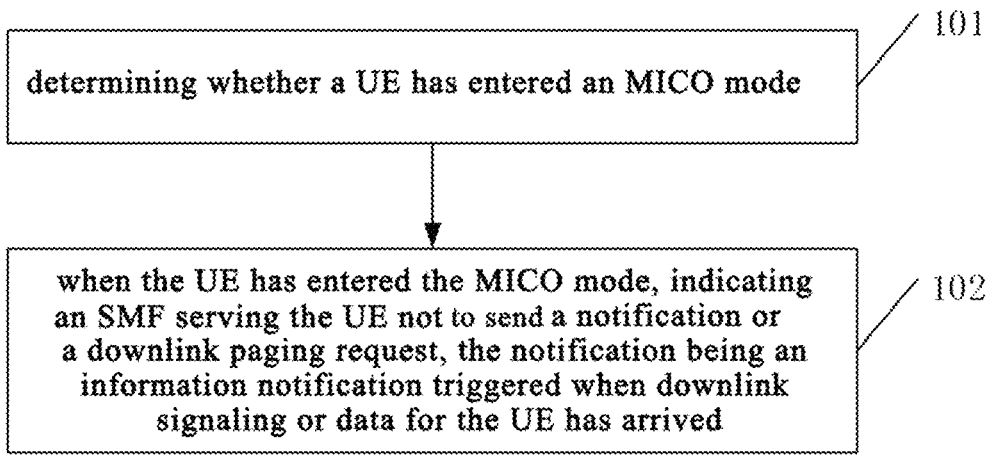
FIG. 1 is a flow chart of an information processing method according to a first embodiment of the present disclosure.

As shown in FIG. 1, the present disclosure provides in this embodiment an information processing method for an AMF, which includes the following steps.

Step 101: determining whether a UE has entered an MICO mode.

In actual use, during a registration or registration update procedure, the UE may indicate a network that the MICO mode needs to be activated. The AMF of the network may determine whether to activate the MICO mode for the UE in accordance with such information as local configuration, subscription and policy. When the MICO mode is to be activated, the AMF may indicate the UE to enter the MICO mode.

Step 102: when the UE has entered the MICO mode, indicating an SMF serving the UE not to send a notification or a downlink paging request. The notification may be information notification triggered when downlink signaling or data for the UE has arrived.

In this embodiment, the SMF serving the UE may be indicated not to send the notification or the downlink paging request during the establishment of a PDU session for the UE, or during the initiation of the downlink paging request by the SMF.

For example, when the UE has entered the MICO mode, the AMF may determine the SMF serving the UE during the establishment of the PDU session for the UE, and transmit an MICO indication to the SMF. The MICO indication may be adopted to indicate the SMF that the UE has entered the MICO mode, so as to enable the SMF not to send the notification or the downlink paging request.

According to the first embodiment of the present disclosure, when the UE has entered the MICO mode, a state of the UE may be notified to the SMF, so it is able to prevent the superfluous interaction between the SMF and the AMF, thereby to reduce the signaling overhead.

Second Embodiment

Figure 2:
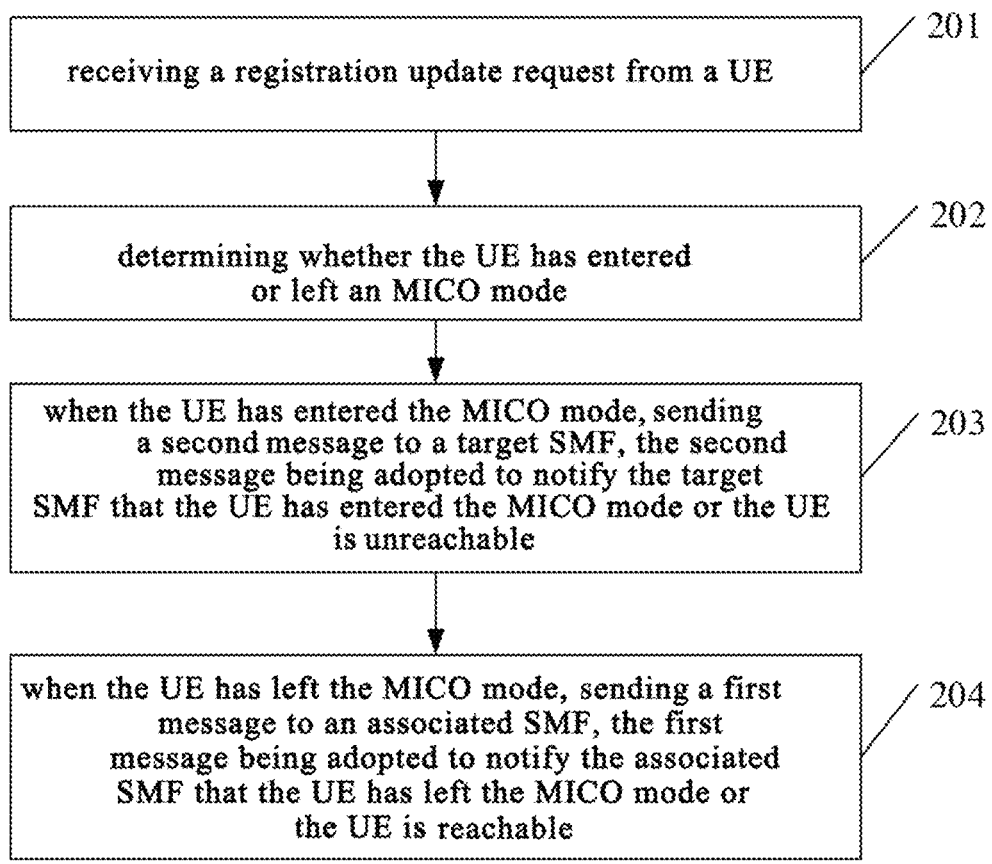
FIG. 2 is a flow chart of an information processing method according to a second embodiment of the present disclosure.

As shown in FIG. 2, the present disclosure provides in this embodiment an information processing method for an AMF, which includes the following steps.

Step 201: receiving a registration update request from a UE.

Step 202: determining whether the UE has entered or left an MICO mode.

In actual use, during a registration or registration update procedure, the UE may indicate a network that the MICO mode needs to be activated. The AMF of the network may determine whether to activate the MICO mode for the UE in accordance with such information as local configuration, subscription and policy. When the MICO mode is to be activated, the AMF may indicate the UE to enter the MICO mode. When the UE has left the MICO mode, the AMF may also know the fact that the UE Has left the MICO mode.

Step 203: when the UE has entered the MICO mode, sending a second message to a target SMF, the second message being adopted to notify the target SMF that the UE has entered the MICO mode or the UE is unreachable.

The target SMF may include an SMF to which no MICO indication or UE-unreachable indication has been transmitted.

To be specific, when the UE has entered the MICO mode, whether there is the target SMF to which no MICO indication or UE-unreachable indication has been transmitted may be determined from all SMFs serving the UE. In actual use, a record may be stored in the AMF, and SMFs to which the MICO indication or the UE-unreachable indication has been transmitted by the AMF may be stored in the record. Hence, through inquiring the record, the AMF may determine whether there is the target SMF in the SMFs serving the UE.

When there is the target SMF and the second message needs to be transmitted to the target SMF, the second message may be transmitted to the target SMF. The second message may be adopted to indicate the target SMF that the UE has entered the MICO mode.

The MICO indication may be carried in the second message. The MICO indication may be adopted to indicate the target SMF that the UE has entered the MICO mode, so as to enable the target SMF not to send a notification or a downlink paging request. The notification may be an information notification triggered when downlink signaling or data for the UE has arrived.

In Step 203, in order to further ensure the communication reliability, prior to sending the notification message to the target SMF, whether the notification message needs to be transmitted to the target SMF may be determined. For example, whether the AMF serving the UE has changed may be determined, and when the AMF has changed, the notification message may be transmitted to the target SMF. The notification message may be adopted to notify the target SMF that the AMF currently serving the UE has changed. In addition, the MICO indication may be carried in the notification message.

Step 204: when the UE has left the MICO mode, sending a first message to an associated SMF, the first message being adopted to notify the associated SMF that the UE has left the MICO mode or the UE is reachable.

The associated SMF may include an SMF to which the MICO indication or the UE-unreachable indication has been transmitted. The first message may be adopted to notify the associated SMF to send a notification or a downlink paging request. The notification may be information notification triggered when downlink signaling or data for the UE has arrived.

During the above procedure, when there is no target SFM or it is unnecessary to send the notification message to the target SMF, a registration update procedure for the UE may be directly completed.

In the related art, when registration update is performed by the UE, the AMF needs to notify position change information about the UE or change information about the AMF to the SMF serving the UE, so as to enable the SMF to perform UPF reselection or issue the downlink paging message. In this embodiment, when the AMF has changed, a new AMF may transmit information indicating that the AMF has changed to the target SMF.

According to the second embodiment of the present disclosure, when the UE has entered the MICO mode, a state of the UE may be notified to the SMF, so it is able to prevent the superfluous interaction between the SMF and the AMF, thereby to reduce the signaling overhead.

Third Embodiment

Figure 3:
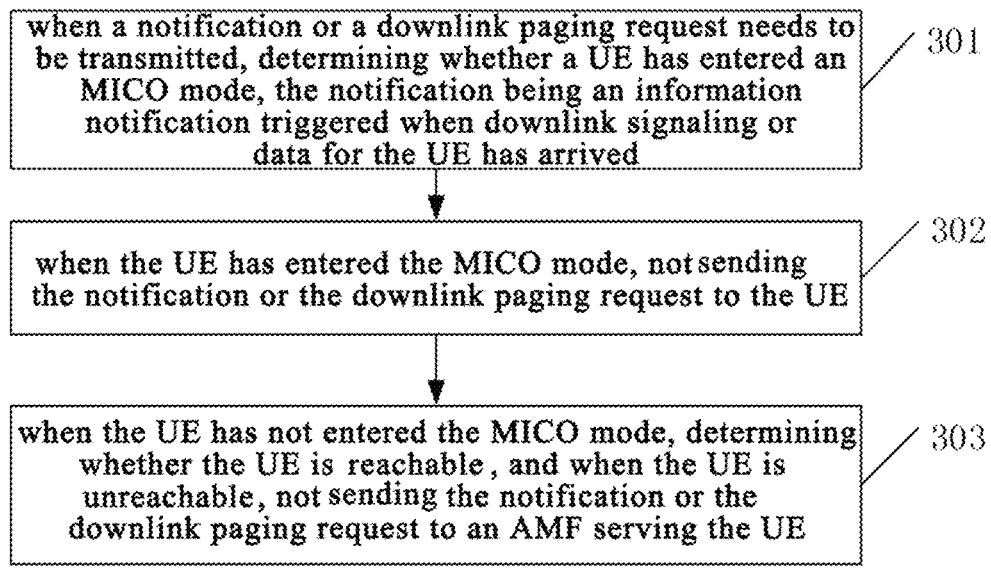
FIG. 3 is a flow chart of an information processing method according to a third embodiment of the present disclosure.

As shown in FIG. 3, the present disclosure provides in this embodiment an information processing method for an SMF, which includes the following steps.

Step 301: when a notification or a downlink paging request needs to be transmitted, determining whether a UE has entered an MICO mode, wherein the notification is downlink signaling or an information notification triggered when a data has arrived.

In this step, whether an MICO indication has been stored may be determined. When the MICO indication has been stored, it may be determined that the UE has entered the MICO mode, and otherwise, it may be determined that the UE has not entered the MICO mode.

Step 302: when the UE has entered the MICO mode, not sending the notification or the downlink paging request to the UE.

Step 303: when the UE has not entered the MICO mode, determining whether the UE is reachable, and when the UE is unreachable, not sending the notification or the downlink paging request to an AMF serving the UE.

To be specific, the SMF may transmit an N11 request to the AMF. When the UE has entered the MICO mode, the AMF may reject the notification or the downlink paging request from the SMF, and transmit the MICO indication or the UE-unreachable indication to the SMF. The MICO indication or the UE-unreachable indication may be adopted to indicate the SMF not to send the notification or the downlink paging request. Upon the receipt of the corresponding indication, the SMF may not transmit the notification or the downlink paging request to the AMF serving the UE.

According to the third embodiment of the present disclosure, when the UE has entered the MICO mode, a state of the UE may be notified to the SMF, so it is able to prevent the superfluous interaction between the SMF and the AMF, thereby to reduce the signaling overhead.

The implementation of the information processing method will be described hereinafter in conjunction with different application scenarios.

Fourth Embodiment

In this embodiment, whether the UE has entered the MICO mode may be indicated to the SMF during the establishment of the PDU session.

Figure 4:
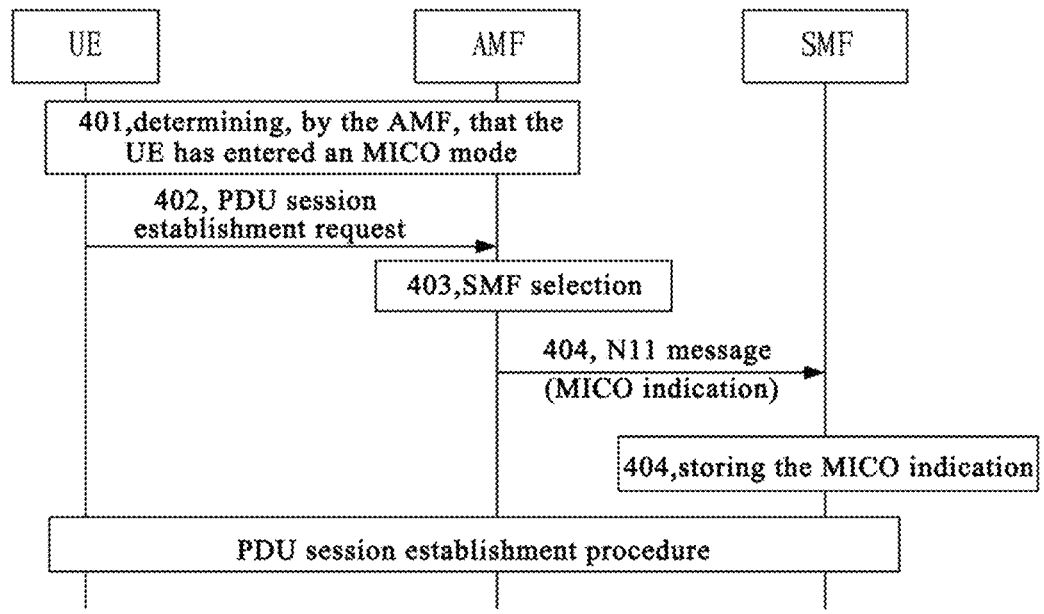
FIG. 4 is a flow chart of an information processing method according to a fourth embodiment of the present disclosure.

As shown in FIG. 4, the information processing method may include the following steps.

Step 401: determining, by the AMF, whether the UE has entered the MICO mode.

To be specific, the AMF may determine whether the MICO mode is to be activated for the UE in accordance with such information as local configuration, subscription and policy. When the MICO mode is to be activated, the AMF may indicate the UE to enter the MICO mode. Here, the AMF may determine that the UE has entered the MICO mode.

Step 402: sending, by the UE, a PDU session establishment request message to the AMF.

Step 403: receiving, by the AMF, the PDU session establishment request from the UE, and selecting the SMF.

Step 404: forwarding, by the AMF, the PDU session establishment request message to the SMF via the N11 message. The MICO indication may be carried in the N11 message, and adopted to indicate the SMF that the UE has entered the MICO mode, so as to enable the SMF to send the notification or the downlink paging request. The notification may be a notification with respect to the arrival of the downlink signaling or data for the UE.

Upon the receipt of the N11 message, the SMF may store the MICO indication carried in the N11 message, and complete the subsequent PDU session establishment.

A downlink paging procedure for the UE may not be triggered by the SMF in accordance with the stored MICO indication.

Fifth Embodiment

In this embodiment, a registration update procedure (without uplink data transmission) for the MICO UE may be taken as an example.

Figure 5:
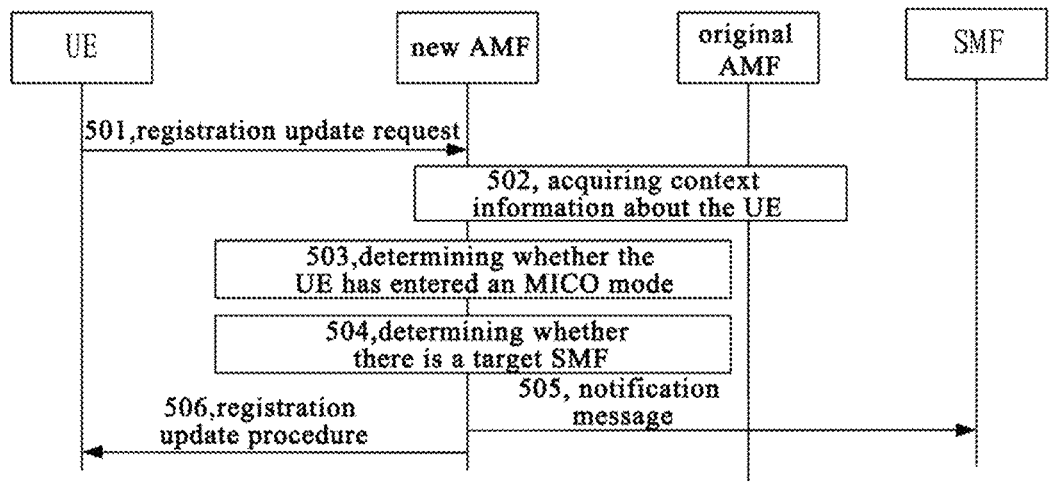
FIG. 5 is a flow chart of an information processing method according to a fifth embodiment of the present disclosure.

As shown in FIG. 5, the information processing method may include the following steps.

Step 501: sending, by the UE, a registration update request to the AMF.

Step 502: when the AMF has changed during the registration update (e.g., when relocation occurs), acquiring, by a new AMF, context information about the UE from an original AMF.

To be specific, the new AMF may transmit an information request message to the original AMF, so as to request for the context information about the UE. The original AMF may transmit the context information about the UE to the new AMF via an information response message.

Step 503: determining, by the new AMF, whether the UE has entered the MICO mode in accordance with the context information about the UE.

Step 504: when the UE has entered the MICO mode, determining where there is the target SMF to which no MICO indication or UE-unreachable indication has been transmitted from all the SMFs serving the UE.

Step 505: when there is the target SMF and the notification message needs to be transmitted to the target SMF, sending the notification message to the target SMF. The MICO indication may be carried in the notification message, and adopted to indicate the target SMF that the UE has entered the MICO mode, so as to enable the target SMF not to send the notification or the downlink paging request. The notification may be a notification with respect to the arrival of the downlink signaling or data for the UE.

Then, the registration update procedure may be completed.

In order to further reduce the signaling overhead, prior to sending the notification message to the target SMF, whether the notification message needs to be transmitted to the target SMF may be determined at first. To be specific, during the determination of whether to send the notification message to the target SMF, when the AMF serving the UE has changed, the notification message may be transmitted to the target SMF. The notification message may be adopted to notify the target SMF that the AMF currently serving the UE has changed. When it is unnecessary to send the notification message to the target SMF, Step 506 may be performed.

Step 506: when there is no target SMF or it is unnecessary to send the notification message to the target SMF, directly completing the registration update procedure for the UE.

To be specific, the new AMF may transmit a registration accept message, and complete the registration update procedure.

In addition, when the UE has not entered the MICO mode, an AMF change notification message may be transmitted to the SMF serving the UE.

During the registration update procedure, when the UE has left the MICO mode, a notification may be transmitted to the associated SMF, and the notification may be adopted to notify the associated SMF that the UE has left the MICO mode. The association SMF may include an SMF to which the MICO indication or the UE-unreachable indication has been transmitted, e.g., an SMF serving the UE, an SMF which has subscribed to the notification, or an SMF which has transmitted the downlink paging request which, however, has been rejected.

During the registration update procedure, when uplink data needs to be transmitted, the UE may carry an identifier in the registration update request, and the identifier may be adopted to indicate that the uplink data needs to be transmitted by the UE. The identifier may be an active flag or a PDU session Identity (ID). At this time, the AMF may transmit a notification message to the SMF which is about to provide data transmission services for the UE, and the notification message may be adopted to notify the SMF which is about to provide the data transmission services for the UE to re-establish a data plane transmission path for the UE.

Sixth Embodiment

In this embodiment, the registration update procedure (with uplink data transmission) for the MICO UE may be taken as an example.

Figure 6:
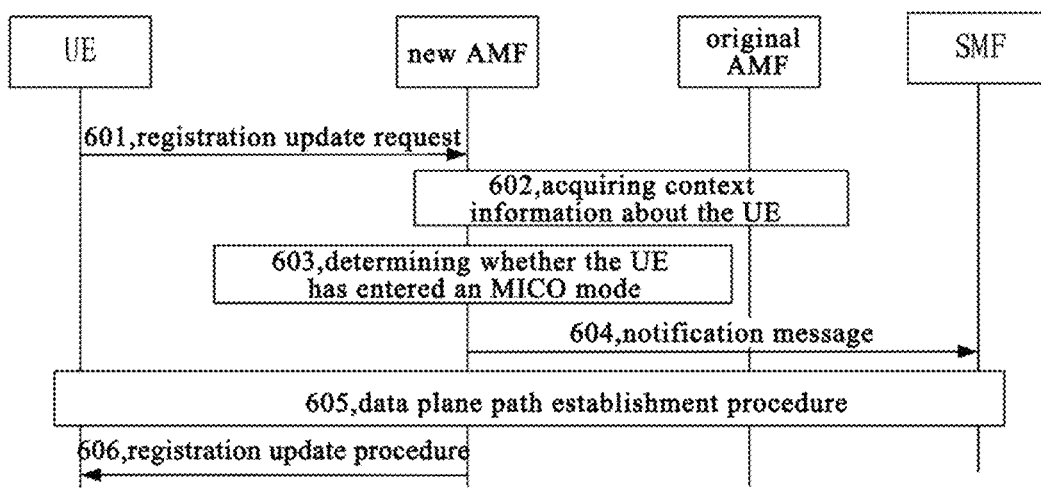
FIG. 6 is a flow chart of an information processing method according to a sixth embodiment of the present disclosure.

As shown in FIG. 6, the information processing method may include the following steps.

Step 601: sending, by the UE, the registration update request to the AMF, so as to indicate that the uplink data is to be transmitted. To be specific, an identifier may be carried in the registration update request, and adopted to indicate that the uplink data needs to be transmitted by the UE. The identifier may be an active flag or a PDU session ID.

The AMF needs to send a notification message to the SMF providing the data transmission services for the UE in accordance with the identifier, regardless of whether the AMF has changed during the registration update procedure. The notification message may be adopted to notify the SMF providing the data transmission services for the UE to restore (re-establish) the data plane transmission path for the UE.

Step 602: when the AMF has changed during the registration update procedure (e.g., when relocation occurs), acquiring, by a new AMF, the context information about the UE from an original AMF.

To be specific, the new AMF may transmit an information request message to the original AMF, so as to request for the context information about the UE. The original AMF May transmit the context information about the UE to the new AMF via an information response message.

Step 603: determining, by the new AMF, whether the UE has entered the MICO mode in accordance with the context information about the UE.

Step 604: when the UE has entered the MICO mode, sending a notification message to the SMF providing the data transmission services for the UE. The notification message may be adopted to notify the SMF providing the data transmission services for the UE to restore the data plane transmission path for the UE.

Step 605: completing, by the associated SMF, the establishment of the data plane path for the UE, and triggering the establishment of an air interface bearer.

Step 606: sending, by the new AMF, a registration accept message, and completing the registration update procedure.

Seventh Embodiment

In this embodiment, a registration update procedure for the UE which has left the MICO mode may be taken as an example.

Figure 7:
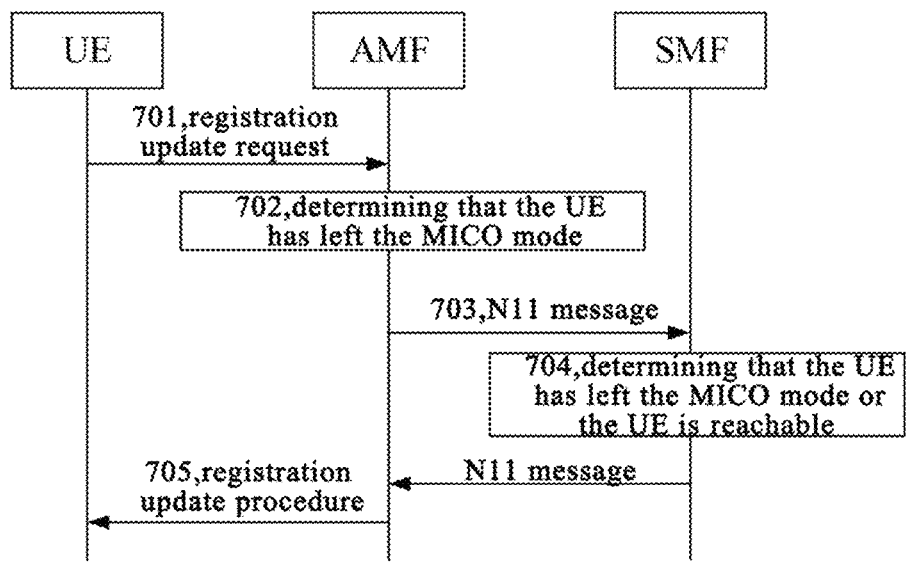
FIG. 7 is a flow chart of an information processing method according to a seventh embodiment of the present disclosure.

As shown in FIG. 7, the information processing method may include the following steps.

Step 701: sending, by the UE, the registration update request to the AMF.

Step 702: determining, by the AMF, that the UE has left the MICO mode.

For example, in response to a request from the UE, the AMF may determine that the UE has left the MICO mode. At this time, the AMF needs to notify the SMF that the UE has left the MICO mode.

Step 703: sending, by the AMF, a notification to the associated SMF. The notification may be adopted to notify the associated SMF that the UE has left the MICO mode.

To be specific, the AMF may transmit an N11 message to the associated SMF, and a notification message may be carried in the N11 message. The notification may be adopted to notify the associated SMF that the UE has left the MICO mode.

The associated SMF may include an SMF to which the MICO indication or the UE-unreachable indication has been transmitted, e.g., an SMF serving the UE, an SMF which has subscribed to the notification, or an SMF which has transmitted the downlink paging request which, however, has been rejected.

Step 704: determining, by the SMF which has received the notification, that the UE has left the MICO mode in accordance with the notification, or determining that the UE has become accessible. Hence, the SMF may trigger a paging process to the AMF subsequently.

The SMF may transmit an N11 response message to the AMF.

Step 705: sending, by the AMF, a registration accept message, and completing the registration update procedure.

Eighth Embodiment

In this embodiment, a process where a downlink paging request is rejected by the AMF may be taken as an example.

Figure 8:
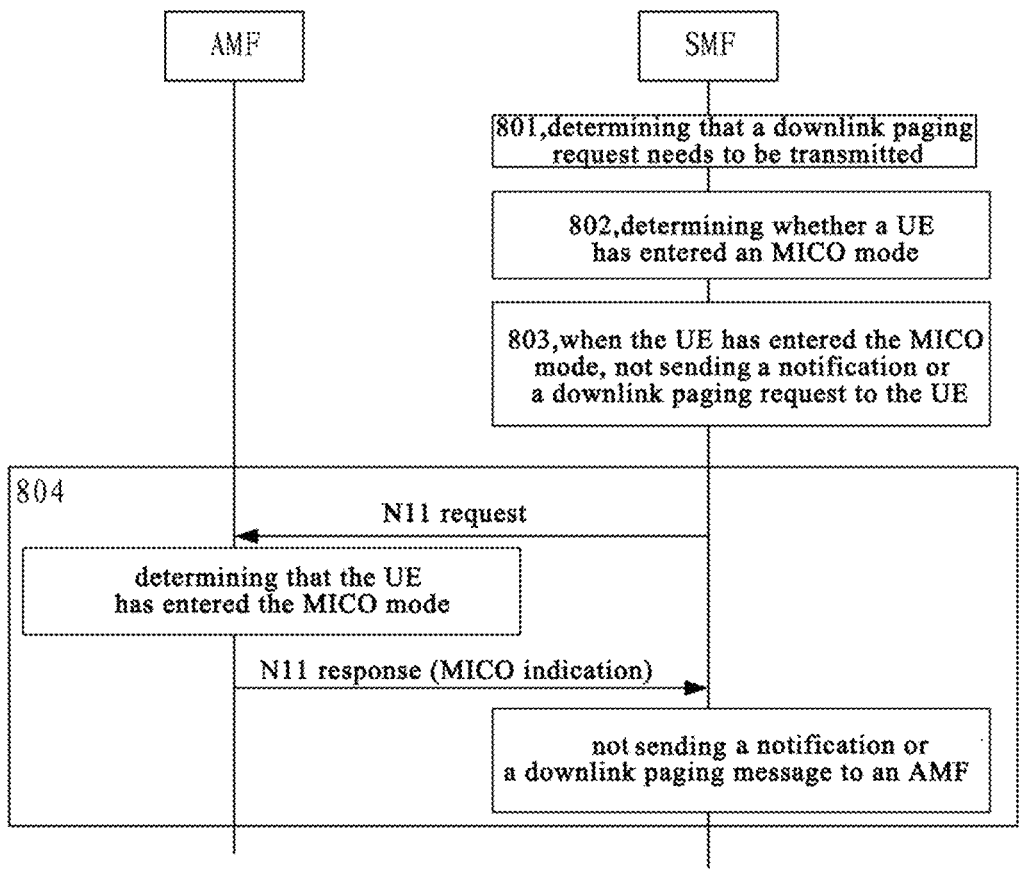
FIG. 8 is a flow chart of an information processing method according to an eighth embodiment of the present disclosure.

As shown in FIG. 8, the information processing method may include the following steps.

Step 801: determining, by the SMF, that a downlink paging request needs to be transmitted in accordance with downlink signaling or data.

Step 802: determining, by the SMF, whether the UE has entered the MICO mode.

To be specific, the SMF may determine whether the MICO indication has been stored, and when the MICO indication has been stored, determine that the UE has entered the MICO mode, and otherwise determine that the UE has not entered the MICO mode.

Step 803: when the UE has entered the MICO mode, not sending a notification or the downlink paging request to the UE. The notification may be a notification with respect to the arrival of the downlink signaling or data for the UE.

Step 804: when the UE has not entered the MICO mode, determining whether the UE is reachable, and when the UE is unreachable, not sending the notification or the downlink paging request to the AMF serving the UE.

To be specific, the SMF may transmit an N11 request to the AMF. When the UE has entered the MICO mode, the AMF may reject the notification or downlink paging request from the SMF, and transmit the MICO indication or UE-unreachable indication to the SMF. The MICO indication or the UE-unreachable indication may be adopted to indicate the SMF not to send the notification or the downlink paging request.

In addition, information about the SMF to which the MICO indication or the UE-unreachable indication has been transmitted may also be stored in the AMF, so as to send a notification indicating that the UE has left the MICO mode to the SMF in accordance with the information after the UE has left the MICO mode.

When the UE is unreachable, the notification or the downlink paging request may be transmitted to the AMF serving the UE.

According to the above fourth to eighth embodiments, when the UE has entered the MICO mode, the SMF serving the UE may be indicated not to send the downlink paging request for the UE, or the notification with respect to the arrival of the downlink signaling or data, so it is able to prevent the superfluous interaction between the SMF and the AMF, thereby to reduce the signaling overhead.

Ninth Embodiment

Figure 9:
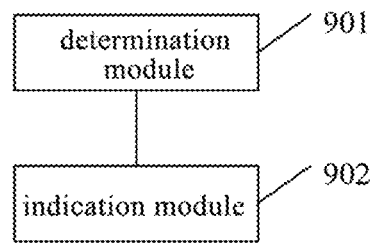
FIG. 9 is a schematic view showing an information processing device according to a ninth embodiment of the present disclosure.

As shown in FIG. 9, the present disclosure provides in this embodiment an information processing device, including: a determination module 901 configured to determine whether a UE has entered an MICO mode; and an indication module 902 configured to, when the UE has entered the MICO mode, indicate an SMF serving the UE not to send a notification or a downlink paging request. The notification may be an information notification triggered when downlink signaling or data for the UE has arrived.

To be specific, the indication module 902 may include: a first determination sub-module configured to, when the UE has entered the MICO mode, determine the SMF serving the UE during the establishment of a PDU session for the UE; and a transmission sub-module configured to send an MICO indication to the SMF. The MICO indication may be adopted to indicate the SMF that the UE has entered the MICO mode, so as to enable the SMF not to send the notification or downlink paging request.

To be specific, the indication module 902 is further configured to, when the UE has entered the MICO mode, reject the notification or downlink paging request from the SMF, and transmit an MICO indication or a UE-unreachable indication to the SMF. The MICO indication or UE-unreachable indication may be adopted to indicate the SMF not to send the notification or downlink paging request.

Figure 10:
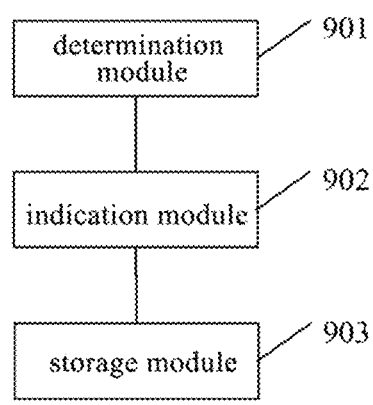
FIG. 10 is a schematic view showing an information processing device according to a ninth embodiment of the present disclosure.

As shown in FIG. 10, the information processing device may further include: a storage module 903 configured to store therein information about an SMF to which the MICO indication or the UE-unreachable indication has been transmitted; and a transmission module configured to, when the UE has left the MICO mode, transmit a notification indicating that the UE has left the MICO mode to the SMF in accordance with the information.

A working principle of the information processing device may refer to that mentioned in the above method embodiment.

According to the ninth embodiment of the present disclosure, when the UE has entered the MICO mode, a state of the UE may be notified to the SMF, so it is able to prevent the superfluous interaction between the SMF and the AMF, thereby to reduce the signaling overhead.

Tenth Embodiment

Figure 11:
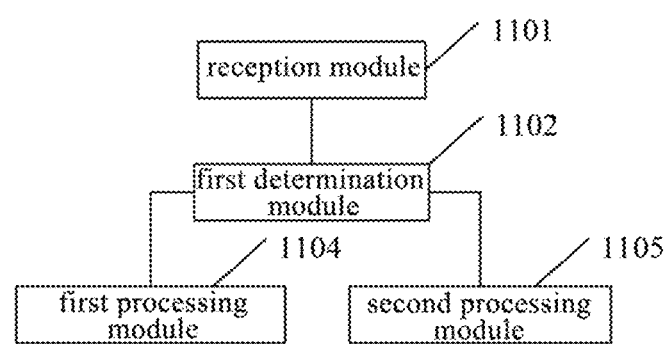
FIG. 11 is a schematic view showing an information processing device according to a tenth embodiment of the present disclosure.

As shown in FIG. 11, the present disclosure provides in this embodiment an information processing device, including: a reception module 1101 configured to receive a registration update request from a UE; a first determination module 1102 configured to determine whether the UE has entered or left an MICO mode; a first processing module 1104 configured to, when the UE has left the MICO mode, transmit a first message to an associated SMF, the first message being adopted to notify the associated SMF that the UE has left the MICO mode or the UE is reachable; and a second processing module 1105 configured to, when the UE has entered the MICO mode, transmit a second message to a target SMF, the second message being adopted to notify the target SMF that the UE has entered the MICO mode or the UE is unreachable.

The associated SMF may include an SMF to which an MICO indication or a UE-unreachable indication has been transmitted, and the target SMF may include an SMF to which no MICO indication or UE-unreachable indication has been transmitted.

The MICO indication may be carried in the second message. The MICO indication may be adopted to indicate the target SMF that the UE has entered the MICO mode, so as to enable the target SMF not to send a notification or a downlink paging request. The notification may be an information notification triggered when downlink signaling or data for the UE has arrived.

Figure 12:
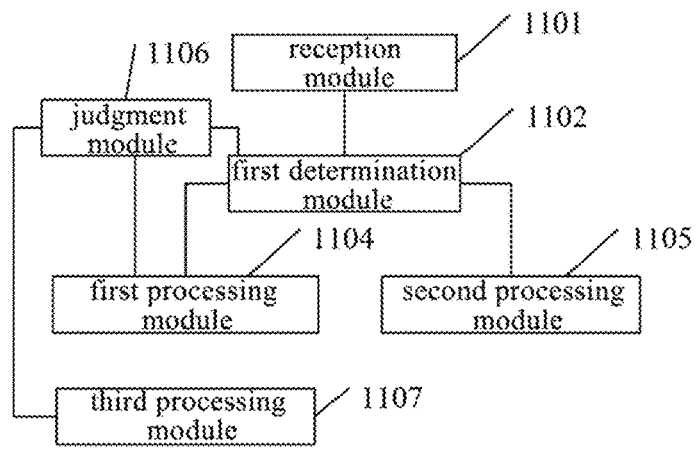
FIG. 12 is a first schematic view showing the information processing device according to the tenth embodiment of the present disclosure.

As shown in FIG. 12, in order to further ensure the communication reliability, the information processing device may further include a judgment module 1106 configured to determine whether there is the target SMF, and determine whether the second message is to be transmitted to the target SMF. As further shown in FIG. 12, the information processing device may further include a third processing module 1107 configured to, when there is no target SMF or it is unnecessary to send the second message to the target SMF, directly complete a registration update procedure for the UE.

The judgment module 1106 may include: a first judgment sub-module configured to determine whether an AMF serving the UE has changed; and a second judgment sub-module configured to, when the AMF serving the UE has changed, determine that the second message is to be transmitted to the target SMF. The second message may also be adopted to notify the target SMF that the AMF currently serving the UE has changed.

Figure 13:
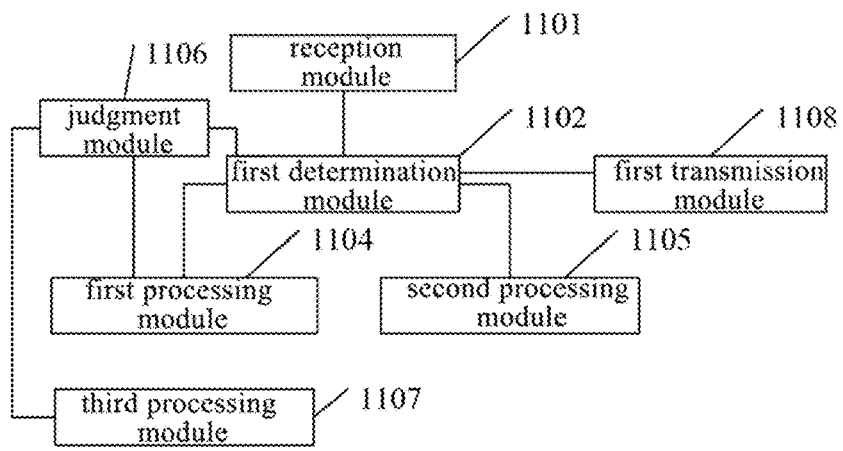
FIG. 13 is a second schematic view showing the information processing device according to the tenth embodiment of the present disclosure.

In actual use, an identifier may be carried in the registration update request and adopted to indicate that uplink data needs to be transmitted by the UE. As shown in FIG. 13, the information processing device may further include a first transmission module 1108 configured to send a third message to the SMF which is about to provide data transmission services for the UE. The third message may be adopted to notify the SMF which is about to provide data transmission services for the UE to re-establish a data plane transmission path for the UE.

The first determination module 1102 may include: an acquisition sub-module configured to acquire context information about the UE from an AMF before position update; and a determination sub-module configured to determine whether the UE has entered or left the MICO mode in accordance with the context information about the UE.

A working principle of the information processing device may refer to that mentioned in the method embodiment.

According to the tenth embodiment of the present disclosure, when the UE has entered the MICO mode, a state of the UE may be notified to the SMF, so it is able to prevent the superfluous interaction between the SMF and the AMF, thereby to reduce the signaling overhead.

Eleventh Embodiment

Figure 14:
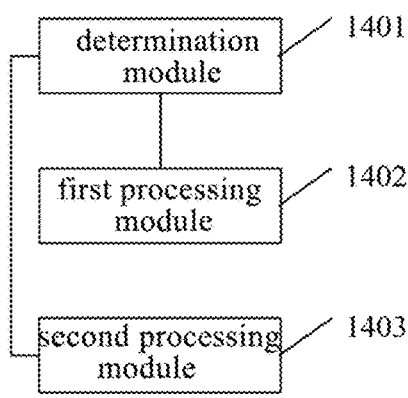
FIG. 14 is a schematic view showing an information processing device according to an eleventh embodiment of the present disclosure.

As shown in FIG. 14, the present disclosure provides in this embodiment an information processing device, including: a determination module 1401 configured to, when a notification or a downlink paging request needs to be transmitted, determine whether a UE has entered an MICO mode, wherein the notification is downlink signaling or an information notification triggered when a data has arrived; a first processing module 1402 configured to, when the UE has entered the MICO mode, not transmit the notification or the downlink paging request to the UE; and a second processing module 1403 configured to, when the UE has not entered the MICO mode, determine whether the UE is reachable, and when the UE is unreachable, not transmit the notification or the downlink paging request to an AMF serving the UE.

The determination module 1401 may include: an information determination sub-module configured to determine whether an MICO indication has been stored; and a first determination sub-module configured to, when the MICO indication has been stored, determine that the UE has entered the MICO mode, and otherwise determine that the UE has not entered the MICO mode.

Figure 15:
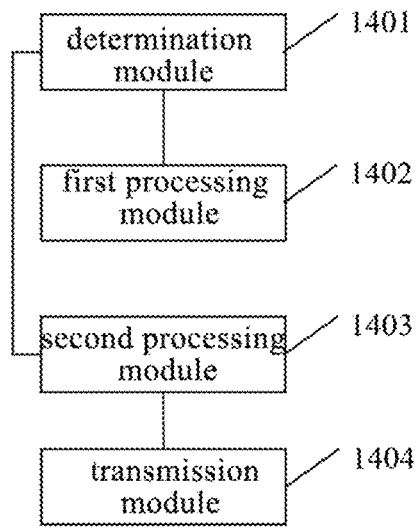
FIG. 15 is another schematic view showing the information processing device according to the eleventh embodiment of the present disclosure.

As shown in FIG. 15, the information processing device may further include a transmission module 1404 configured to, when the UE is reachable, transmit the notification or the downlink paging request to the AMF serving the UE.

A working principle of the information processing device may refer to that mentioned in the above method embodiment.

According to the eleventh embodiment of the present disclosure, when the UE has entered the MICO mode, a state of the UE may be notified to the SMF, so it is able to prevent the superfluous interaction between the SMF and the AMF, thereby to reduce the signaling overhead.

The present disclosure further provides in a twelfth embodiment a computer-readable storage medium storing therein a computer program. The computer program may be executed by a processor so as to implement the above-mentioned information processing methods.

Thirteenth Embodiment

Figure 16:
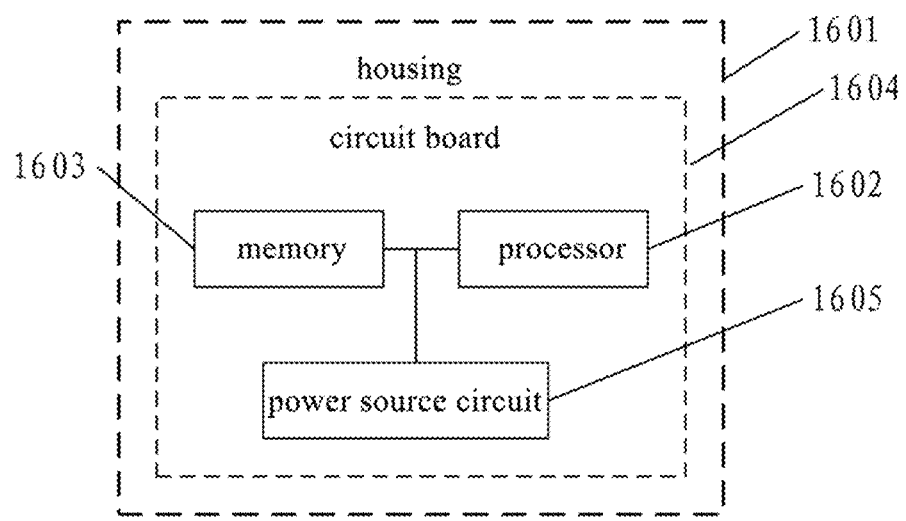
FIG. 16 is a schematic view showing an electronic device according to a thirteenth embodiment of the present disclosure.

As shown in FIG. 16, the present disclosure provides in this embodiment an electronic device, which includes a housing 1601, a processor 1602, a memory 1603, a circuit board 1604 and a power source circuit 1605. The circuit board 1604 is arranged within a chamber defined by the housing 1601, and the processor 1602 and the memory 1603 are arranged on the circuit board 1604. The power source circuit 1605 is configured to supply power to each circuit or element of the electronic device. The memory 1603 is configured to store therein an executable program code. The processor 1602 is configured to read the executable program code stored in the memory 1603 so as to run a program corresponding to the executable program code, thereby to implement the above-mentioned information processing methods.

The implementation of the above steps through the processor 1602 may refer to that mentioned in the above method embodiments, and thus will not be particularly defined herein.

The present disclosure further provides in a fourteenth embodiment a data processing device, including a processor, and a memory connected to the processor via a bus interface. The memory is configured to store therein programs and data for the operation of the processor. The processor is configured to call and execute the programs and data stored in the memory, so as to implement the following function modules or units: a determination module configured to determine whether a UE has entered an MICO mode; and an indication module configured to, when the UE has entered the MICO mode, indicate an SMF serving the UE not to send a notification or a downlink paging request, wherein the notification is downlink signaling or an information notification triggered when a data has arrived.

The present disclosure further provides in a fifteenth embodiment a data processing device, including a processor, and a memory connected to the processor via a bus interface. The memory is configured to store therein programs and data for the operation of the processor. The processor is configured to call and execute the programs and data stored in the memory, so as to implement the following function modules or units: a reception module configured to receive a registration update request from a UE; a first determination module configured to determine whether the UE has entered or left an MICO mode; a first processing module configured to, when the UE has left the MICO mode, transmit a first message to an associated SMF, the first message being adopted to notify the associated SMF that the UE has left the MICO mode or the UE is reachable; and a second processing module configured to, when the UE has entered the MICO mode, transmit a second message to a target SMF, the second message being adopted to notify the target SMF that the UE has entered the MICO mode or the UE is unreachable.

The present disclosure further provides in a sixteenth embodiment a data processing device, including a processor, and a memory connected to the processor via a bus interface. The memory is configured to store therein programs and data for the operation of the processor. The processor is configured to call and execute the programs and data stored in the memory, so as to implement the following function modules or units: a determination module configured to, when a notification or a downlink paging request needs to be transmitted, determine whether a UE has entered an MICO mode, wherein the notification is downlink signaling or an information notification triggered when a data has arrived; a first processing module configured to, when the UE has entered the MICO mode, not transmit the notification or the downlink paging request to the UE; and a second processing module configured to, when the UE has not entered the MICO mode, determine whether the UE is reachable, and when the UE is unreachable, not transmit the notification or the downlink paging request to an AMF serving the UE.

It should be appreciated that, the data processing devices in the fourteenth, fifteenth and sixteenth embodiments are capable of implementing the information processing methods mentioned hereinabove respectively, so the implementations of the data processing devices in the fourteenth, fifteenth and sixteenth embodiments may refer to those of the above information processing methods with a same or similar beneficial effect.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information processing method, which is realized by an Access and Mobility Management Function (AMF), comprising:

receiving a registration update request from a User Equipment (UE);

determining whether (i) the UE has entered into a Mobile Initiated Connection Only (MICO) mode from another mode of the UE being not in the MICO mode or (ii) the UE has left the MICO mode and entered into the other mode of the UE being not in the MICO mode;

sending a first message to an associated Session Management Function (SMF), in response to determining that the UE has left the MICO mode and entered into the other mode of the UE being not in the MICO mode, the first message being adopted to notify the associated SMF that the UE has left the MICO mode or the UE is reachable; and/or sending a second message to a target SMF, in response to determining that the UE has entered the MICO mode from the other mode of the UE being not in the MICO mode, the second message being adopted to notify the target SMF that the UE has entered the MICO mode or the UE is unreachable, wherein the UE that has entered the MICO mode merely initiates a mobile originated procedure rather than listening to network paging.

2. The information processing method according to claim 1, wherein the associated SMF comprises an SMF to which an MICO indication or a UE-unreachable indication has been transmitted, and the target SMF comprises an SMF to which the MICO or UE-unreachable indication has not yet been sent.

3. The information processing method according to claim 1, wherein the MICO indication is carried in the second message, and the MICO indication is adopted to indicate the target SMF that the UE has entered the MICO mode so as to enable the target SMF not to send a notification or a downlink paging request, wherein the notification is downlink signaling of the UE or an information notification triggered when a data has arrived.

4. The information processing method according to claim 1, further comprising:

determining whether there is the target SMF and determining whether to send the second message to the target SMF.

5. The information processing method according to claim 4, further comprising:

completing directly a registration update procedure for the UE, when there is no target SMF or it is unnecessary to send the second message to the target SMF.

6. The information processing method according to claim 1, wherein an identifier is carried in the registration update request and adopted to indicate that uplink data needs to be transmitted by the UE, wherein the information processing method further comprises:

sending a third message to the SMF which is about to provide data transmission services for the UE, and the third message is adopted to notify the SMF which is about to provide data transmission services for the UE to re-establish a data plane transmission path for the UE.

7. The information processing method according to claim 1, wherein the determining whether the UE has entered or left the MICO mode comprises: acquiring context information about the UE from an AMF before position update; and determining whether the UE has entered or left the MICO mode in accordance with the context information about the UE.

8. A non-transitory computer-readable storage medium storing therein a computer program, wherein the computer program is executed by a processor so as to implement the information processing method according to claim 1.

9. An electronic device, which is arranged at an Access and Mobility Management Function (AMF), the electronic device comprising a housing, a processor, a memory, a circuit board and a power source circuit, wherein the circuit board is arranged within a chamber defined by the housing, and the processor and the memory are arranged on the circuit board, wherein the power source circuit is configured to supply power to each circuit or element of the electronic device, the memory is configured to store therein an executable program code, and the processor is configured to read the executable program code stored in the memory so as to run a program corresponding to the executable program code, thereby to implement the information processing method according to claim 1.

10. The electronic device according to claim 9, wherein the MICO indication is carried in the second message, and the MICO indication is adopted to indicate the target SMF that the UE has entered the MICO mode so as to enable the target SMF not to send a notification or a downlink paging request, wherein the notification is downlink signaling of the UE or an information notification triggered when a data has arrived.

11. An information processing method, which is realized by an Access and Mobility Management Function (AMF), comprising:

determining whether (i) a User Equipment (UE) has entered into a Mobile Initiated Connection Only (MICO) mode from another mode of the UE being not in the MICO mode or (ii) the UE has left the MICO mode and entered into the other mode of the UE being not in the MICO mode; and indicating a Session Management Function (SMF) serving the UE not to send a notification or a downlink paging request, in response to determining that the UE has entered into the MICO mode from the other mode of the UE being not in the MICO mode, wherein the notification is downlink signaling or an information notification triggered when a data has arrived, wherein the UE that has entered the MICO mode merely initiates a mobile originated procedure rather than listening to network paging.

12. The information processing method according to claim 11, wherein the indicating the SMF serving the UE not to send the notification or downlink paging request when the UE has entered the MICO mode comprises:

determining the SMF serving the UE during the establishment of a Protocol Data Unit (PDU) session for the UE; and sending an MICO indication to the SMF, when the UE has entered the MICO mode, the MICO indication being adopted to indicate the SMF that the UE has entered the MICO mode so as to enable the SMF not to send the notification or downlink paging request.

13. The information processing method according to claim 11, wherein the indicating the SMF serving the UE not to send the notification or downlink paging request when the UE has entered the MICO mode comprises:
rejecting the notification or downlink paging request from the SMF, and sending the MICO indication or a UE-unreachable indication to the SMF, when the UE has entered the MICO mode, wherein the MICO indication or the UE-unreachable indication is adopted to indicate the SMF not to send the notification or the downlink paging request.

14. The information processing method according to claim 13, further comprising: storing information about the SMF to which the MICO indication or the UE-unreachable indication has been transmitted; and sending a notification indicating that the UE has left the MICO mode to the SMF in accordance with the information, when the UE has left the MICO mode.

15. An electronic device, which is arranged at an Access and Mobility Management Function (AMF), the electronic device comprising a housing, a processor, a memory, a circuit board and a power source circuit, wherein the circuit board is arranged within a chamber defined by the housing, and the processor and the memory are arranged on the circuit board, wherein the power source circuit is configured to supply power to each circuit or element of the electronic device, the memory is configured to store therein an executable program code, and the processor is configured to read the executable program code stored in the memory so as to run a program corresponding to the executable program code, thereby to implement the information processing method according to claim 11.

16. A non-transitory computer-readable storage medium storing therein a computer program, wherein the computer program is executed by a processor so as to implement the information processing method according to claim 11.

17. An information processing method, which is realized by a Session Management Function (SMF), comprising:
determining whether (i) a User Equipment (UE) has entered into a Mobile Initiated Connection Only (MICO) mode from another mode of the UE being not in the MICO mode or (ii) the UE has left the MICO mode and entered into the other mode of the UE being not in the MICO mode, when a notification or a downlink paging request needs to be transmitted, wherein the notification is downlink signaling or an information notification triggered when a data has arrived;
not sending the notification or the downlink paging request to the UE, in response to determining that the UE has entered into the MICO mode from the other mode of the UE being not in the MICO mode; and/or
not sending the notification or the downlink paging request to an Access and Mobility Management Function (AMF) serving the UE, in response to determining that the UE has not entered into the MICO mode from the other mode of the UE being not in the MICO mode or when the UE is unreachable,
wherein the UE that has entered the MICO mode merely initiates a mobile originated procedure rather than listening to network paging.

18. The information processing method according to claim 17, wherein the determining whether the UE has entered the MICO mode comprises: determining whether an MICO indication has been stored; and when the MICO indication has been stored, determining that the UE has entered the MICO mode, and otherwise determining that the UE has not entered the MICO mode.

19. The information processing method according to claim 17, further comprising: sending the notification or the downlink paging request to the AMF serving the UE, when the UE is reachable.

20. An electronic device, which is arranged at a Session Management Function (SMF), the electronic device comprising a housing, a processor, a memory, a circuit board and a power source circuit, wherein the circuit board is arranged within a chamber defined by the housing, and the processor and the memory are arranged on the circuit board, wherein the power source circuit is configured to supply power to each circuit or element of the electronic device, the memory is configured to store therein an executable program code, and the processor is configured to read the executable program code stored in the memory so as to run a program corresponding to the executable program code, thereby to implement the information processing method according to claim 17.

* * * * *